United States Patent [19]
Allen

[11] Patent Number: 6,142,572
[45] Date of Patent: Nov. 7, 2000

[54] BUDDY TRACTOR SEAT AND MOUNTING

[76] Inventor: Dan Allen, 706 Walnut St., Rolfe, Iowa 50581

[21] Appl. No.: 09/017,885

[22] Filed: Feb. 3, 1998

[51] Int. Cl.[7] .................................................. A47C 1/12
[52] U.S. Cl. ................................... 297/445.1; 297/217.7; 297/232; 296/63
[58] Field of Search ........................... 297/445.1, 450.1, 297/451.4, 232, 217.7, 452.39; 296/63, 64

[56] References Cited

U.S. PATENT DOCUMENTS

| | | | |
|---|---|---|---|
| 1,710,616 | 4/1929 | Guernsey | 296/64 |
| 2,318,751 | 5/1943 | Carlson | 296/64 |
| 3,241,884 | 3/1966 | Thatcher et al. | 297/451.4 |
| 3,405,972 | 10/1968 | Morris | 297/217.7 |
| 3,669,499 | 6/1972 | Semplonius et al. | 297/445.1 |
| 5,102,192 | 4/1992 | Barile, Sr. | 297/232 X |

FOREIGN PATENT DOCUMENTS 1265567  5/1961  France ................................ 297/445.1

*Primary Examiner*—Laurie K. Cranmer
*Attorney, Agent, or Firm*—Gunn & Associates, P.C.

[57] ABSTRACT

This disclosure is directed to a buddy seat for a tractor. From the bottom, it incorporates a J-shaped frame having three legs, the longer vertical leg extending upward into a seat portion. It terminates at the bottom with a horizontally bent portion on the floorboard and an upstanding distal leg adjacent to the hump in the floorboard. That leg connects with a transverse or horizontal foundation leg with fasteners for attachment. The back of the seat is orthopedically shaped to define a back cushion, a bottom cushion is adjacent to it, and the two cushions are supported by an L-shaped bracket. The bracket has an included angle to provide comfort to the passenger.

16 Claims, 2 Drawing Sheets

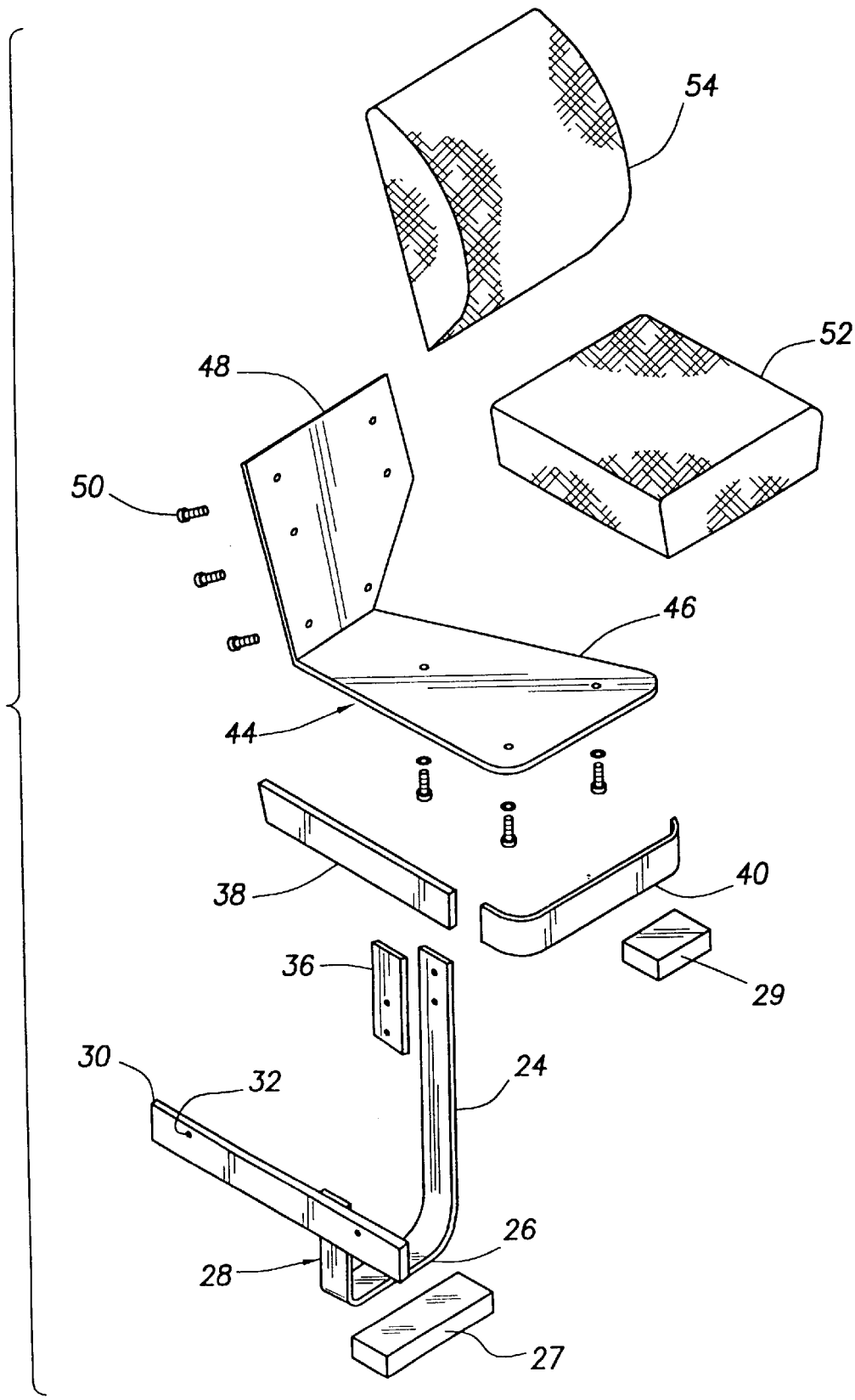

BUDDY TRACTOR SEAT AND MOUNTING

BACKGROUND OF THE DISCLOSURE

This disclosure is directed to a buddy seat or a second seat to be attached to a tractor. In recent times, farming operations have become mechanized through the use of tractors including equipment pulled by the tractors. Not only are they usually equipped with a tow bar connected pivotally to towed equipment, they also are provided with power take off (PTO) mechanisms. The towed equipment may be passive in the sense of a trailer or relatively complex and operate in a fairly interactive manner. A tractor pulling a field trailer does not particularly involve the attention of the tractor driver. By contrast, a lot of towed equipment or equipment connected to the PTO requires constant observation. Not only must the operator steer the tractor to guide the wheels and the towed equipment along the hills and rows, or alternately to cut to the maximum width a carpeted field of wheat (a crop grown without rows) but the operator has to be alert at all times regarding the movement of the tractor and towed equipment. Secondary attention is directed to the operation of the towed equipment, i.e., its alignment with the crop, optimum alignment with a trailer filled with the harvested crop, adjustments in cutting bars, and other operative aspects of the towed equipment.

The towed equipment usually has its own power plant. If that is the case, that must be monitored continuously for optimum operation. It has to be monitored to observe operating temperatures and fuel levels. There are these and many other data that must be observed relating to the operation of the tractor itself, the towed equipment and the terrain. All of this requires a continual awareness of the circumstances just mentioned as well as observation of terrain, fences and other obstacles; operator alertness is an important factor. In many instances, the operator is helped by a co-worker. The co-worker can visually observe operative conditions and the equipment. The co-worker can also watch over the shoulder where most of the action occurs without having to worry about looking forward to steer the equipment. Accordingly, the present disclosure sets forth an improved seat for attachment to a tractor so that a co-worker can ride with the operator. The present apparatus is affectionately known as a buddy seat. The buddy seat of this disclosure is constructed with a mounting mechanism that takes into account the tractor shape adjacent to the driver. The driver normally rests on a seat which is mounted on the centerline axis of the tractor. It is commonplace that the tractor will locate the steering wheel centered structurally (in contrast with automobiles where steering is from one side) and positions the steering wheel, instrument dash, foot pedals and floorboard typically between the two larger rear wheels. The larger rear wheels normally are the power wheels while the front wheels are smaller and not involved in power transfer. In many instances, the front wheels are quite small, and they are unpowered. They provide steering but not traction for forward motion. To protect the driver, the rear wheels are enclosed in surrounding fenders which keep mud from splashing on the tractor operator. The fenders are large because the wheels are large. Indeed, the two drive wheels can stand as tall as the operator. When the operator stands on the floorboard, the driver is able to see over the cowling that surrounds the power plant. The position of the driver is confined behind the steering wheel centered adjacent to the large. somewhat bulbous fenders. The buddy seat of this disclosure permits a helper to ride the tractor in relative comfort where support and room is confined by the fenders. The passenger in the buddy seat is provided with a cantilevered mounting mechanism supporting the buddy seat so that vision is relatively good and the comfort of the seat is quite good also. In one aspect, the device is an appendage which is selectively placed on the tractor and later removed. The mounting structure permits that. The mounting system cantilevers the seat so that there is a shock absorbing aspect. The buddy is able to ride on a cushion with a back. Both the seat and back are relatively comfortable because they are mounted at an appropriate angle for comfort without tiring during operation. Moreover, the buddy seat is mounted to the side of the driver seat sufficient that there is no interference.

In one aspect, the present invention accomplishes a mounting scheme for a buddy seat passenger. The passenger can be merely observing what is going on, but the buddy seat is located so that the passenger can provide observation and commentary to the driver. This helps the driver handle the many obligations imposed during tractor operation with attached equipment.

The novel buddy seat of this disclosure can be attached to the tractor at the left or right of the centerline tractor seat for the driver. Moreover, it mounts in such a way that attachments to the tractor are held to a minimum. The device is attached with two or three bolts which are not on the floorboard. At the floorboard, there is a tendency for mud to collect so that any moisture on the floorboard may rust through at the bolt holes. In this version, the point of attachment is above the floorboard level. The weight is supported on the floorboard but that is accomplished without drill holes.

BRIEF SUMMARY OF THE DISCLOSED APPARATUS

The present disclosure sets out a buddy seat for a tractor which comprises a seat appropriately raised on a framework or support. The seat portion is formed of an L-shaped bracket having a back portion which stands nearly upright over a seat portion. The back and seat bracket legs are conveniently made of one piece of metal which is folded to define an angle of about 75 to 85°. This cants the back so that the rider is provided with some comfort. A more or less uniform thickness of seat cushion is placed on the bottom and an orthopedically curved back cushion is preferably nearly at right angles to it. The cushions are attached. Underneath, a rectangular base supports the seat and is appended at the top end of an upstanding J-shaped support. The support curls in a J-shape where the lower end rests on the floorboard and the distal end curls upwardly to support a horizontal frame. The horizontal frame is drilled and suitable fasteners are put through it to anchor the support.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is an exploded view of the support components showing attachment to the seat portion.

DETAILED DESCRIPTION OF THE PREFERRED EMBODIMENT

Figure 1:
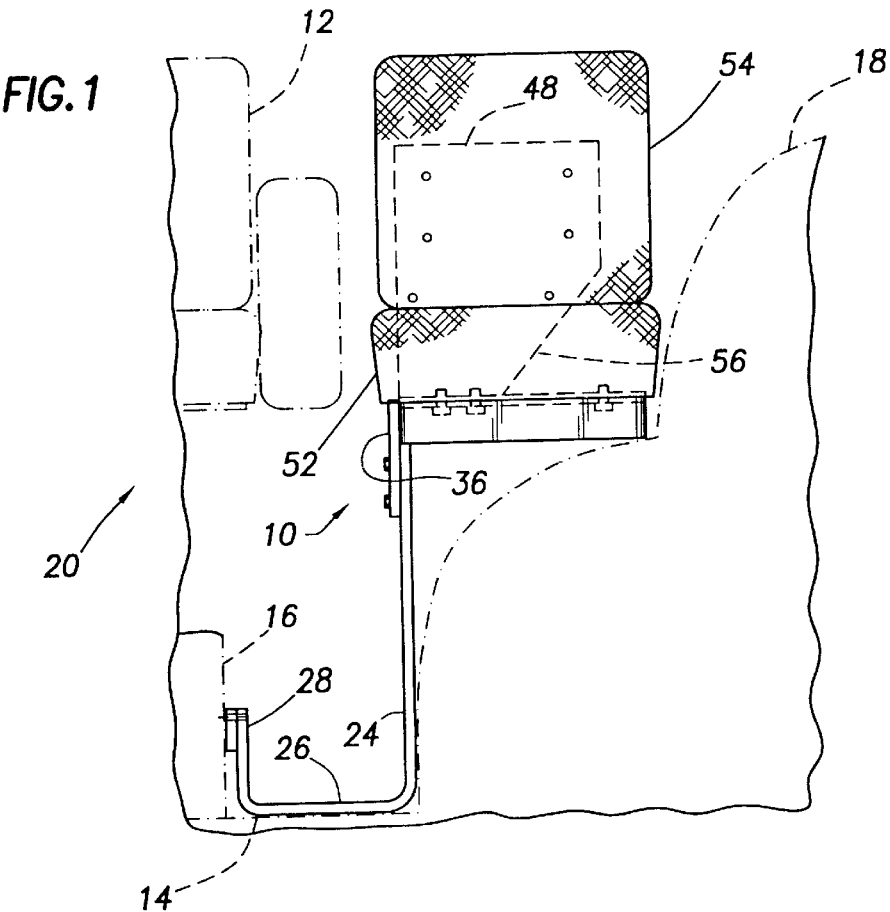
FIG. 1 is a front view of the seat and support thereunder of the present disclosure mounted on a tractor represented in dotted line.
Figure 2:
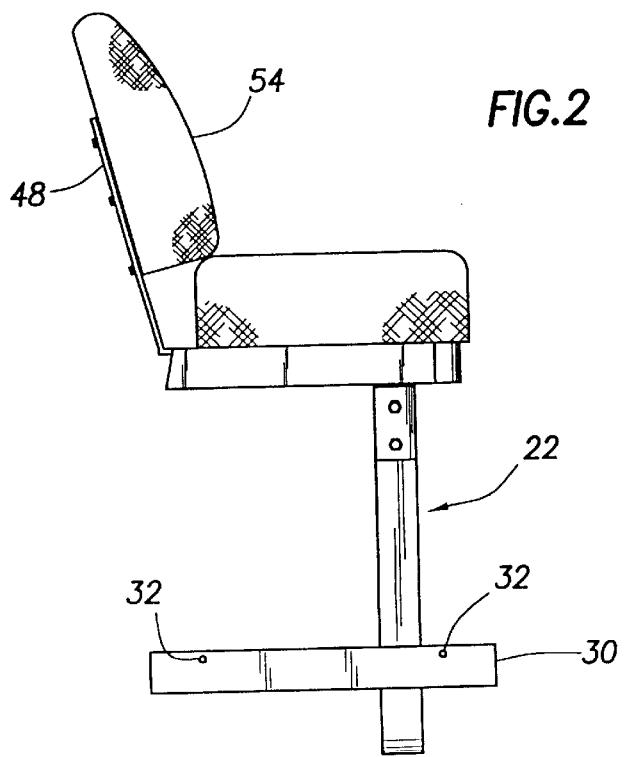
FIG. 2 is a view at right angles to the front view of FIG. 1.

Attention is directed to FIG. 1 where the buddy seat 10 of the present disclosure is shown attached to a tractor. Certain components of the tractor will be mentioned first to provide the context. The context determines the confines and restrictions on the buddy seat 10, setting that out in some detail before going into the details of the buddy seat 10. To this end, the buddy seat is constructed so that it mounts next to the drivers seat 12 provided for the tractor driver or operator. The tractor is constructed with a bottom floor plate or deck 14. Typically, the tractor has a drive shaft from the engine in front back to a rear axle which connects to the left and right with a hump in the floorboard 14. The hump 16 houses the differential for the rear wheels. The rear wheels (not shown) are arranged to the left and right of the operator seat 12 and are enclosed in appropriate fenders to the left and right of the driver. The fenders 18 are mounted to the left and right which limits the space and accessibility of the buddy seat of the present disclosure. Collectively, these components form the tractor 20 which is primarily shown in phantom line. To provide a representative model, the tractor 20 is any of the models in the 8000 series of the Deere Company. The tractor has the deck or floorboard 14. In this area, mud and other sources of water will typically accumulate. The present apparatus mounts on the floorboard 14 but it is mounted so that it does not puncture or penetrate the floorboard. Rather, it is constructed so that no holes are formed in the floorboard to avoid rust. Moreover, it is constructed so that the person using the buddy seat can position their legs, so to speak, over the curving fender region adjacent to the tractor driver seat 12. The seat is better shown in FIG. 2 of the drawings. The J-shaped support 22 has an upstanding major lets 24, bottom leg 26, and an anchor leg 28. The legs 24, 26 and 28 are bent at right angles as shown in FIG. 1 to thereby define a J-shaped support. The width is defined by the leg 26; the width 26 comprises a length selected to fit against the floorboard without banging against the fender 18 while fitting in that region. Restated, the floorboard is narrow to the side of the tractor seat 12. Accordingly, the leg 26 is maintained sufficiently narrow that it fits against the floorboard. The upstanding leg 28 is parallel to and spaced a short distance from the hump 16 in the floorboard. That spacing can be varied between models. It is varied to permit mounting of a foundation frame member horizontally against the hump 16 as shown in FIG. 2. The foundation frame member 30 is provided with two or more spaced holes for bolts or other fasteners to extend into the hump 16. This enables the foundation frame member 30 to be anchored firmly. Moreover, the fasteners 32 are spaced apart to connect with a relatively wide footprint which is more stable for the support. As an aside, it might be noted that sacrificial shim stock 27 made of wood or rubber can be placed against the J-shaped support on the bottom side. This will cushion the contact of metal against metal and ease the point loading which would otherwise scratch and scrape the protective paints on the tractor.

Attention is now directed to FIG. 3 of the drawings. Continuing at the lower portions, the fasteners 32 connect with the tractor. The foundation frame member 30 is joined to the leg 28 by welding. The upper end of the leg 24 is provided with appropriate bolt mounting holes. A reinforcing external gusset 36 is attached to the outside of the upper end. In turn, that attaches immediately adjacent to a rectangular bottom brace formed of a side piece 38 and a transverse front piece 40. The side piece 38 and the front piece 40 define a rectangular frame which is securely anchored by bolts or welding to the leg 24 of the support under the seat assembly. Regarding the support under the seat assembly, it is constructed with a rectangular shape so that adequate nether side bracing is obtained. It shifts, however, the bulk of the weight to the leg 24. As will be observed in FIGS. 1 and 2, the leg 24 is not centered; it is offset to the side and also to the forward edge. This places torque on the connection. The reinforcing gusset 36 helps counter the torque which would otherwise tend to fracture any weld connections. Even if the person on the seat weighed only 150 pounds and rests only two-thirds of their weight on the seat, positioning 100 pounds of weight at the center of the seat provides a very substantial torque working against the connectors at the top end of the leg 24. To provide adequate structural support, the gusset is incorporated as noted. To the extent possible, the lower side is modified for instance by omission of a second lengthwise frame member 38. The lower side is shaped, contoured and laid out so that the user is, in part, supported by the fender 18. While the front right corner of the seat is directly over the leg 24, the left rear corner is typically cantilevered unless it is supported on the fender. That can be achieved dependent on the width and length of the seat cushion, and the near proximity of the fender 18. Suffice it to say, it may rest on the fender or not. Where weight is placed on the fender, it is again desirable that a resilient pad 29 be placed on the fender to avoid scuffing and scratching.

Continuing with FIG. 3, an L-shaped bracket 44 is formed into two planar portions. The bottom portion 46 is ultimately positioned approximately horizontally while the back portion 48 is bent upwardly at an angle. This angle is somewhere between 5 to 15° behind the vertical. Both planar portions 46 and 48 are made of relatively thick plate material. They are drilled at appropriate locations and a number of fasteners 50 are illustrated. The fasteners extend through the two plate portions to hold the cushions. A bottom cushion 52 is attached by bolts or other fasteners on the bottom plate 46; the back cushion 54 is attached at the inclined vertical angle on the plate 48. In the finished state. this angle is better shown in FIG. 2 of the drawings. That shows how the back is orthopedically curved for the comfort of the passenger. FIGS. 1 and 2 both show the various fasteners at a number of locations. FIG. 1 shows the back 48 in phantom line and incorporates the notch at the lower right corner. As a convenience at the time of manufacture, some reduction in weight can be obtained. Even with weight reduction. the seat provides a structure which nevertheless has adequate support for the user. It is not flimsy as a result of the omission of metal implied at the dotted line 56 (FIG. 1).

Continuing with other aspects of construction, the frame members 38 and 40 are preferably spot welded to be attached to the L-shaped steel bracket 44. A quality connection is made so that the seat does not twist off, and that is in turn joined with the upstanding leg 24 safely anchored with the reinforcing gusset 36.

In operation, this apparatus is attached easily because the only connectors utilized are the fasteners 32. They are connected in a remote location so they are out of harm's way, and they are also connected so that they can connect through permanently made holes in the hump 16 without fear of rusting out that region. Attachment is easily achieved with suitable threaded fasteners. Removal is equally easy and is accomplished in the same manner. The present invention can be installed on either side of the seat 12. Whether on the right or left, the seats are constructed in the same fashion. The support portion underneath is reversed in relative position with respect to the seat.

While the foregoing is directed to the preferred embodiment of the present invention, other and further embodiments of the invention may be devised without departing from the basic scope thereof, and the scope thereof is determined by the claims which follow.

What is claimed is:

1. A buddy seat for installation in a tractor adjacent to a driver's seat wherein the buddy seat is confined by the driver's seat and a rear wheel fender, and the buddy seat comprising:
   (a) an upper end seat assembly having
      (i) a plate having a bottom portion and a bent back portion where the two are set at a desired angle with respect to each other,
      (ii) a bottom cushion on the bottom plate portion, and a back cushion on the back plate portion;
   (b) a seat support comprising a connected upwardly extending elongate vertical support member deployed from the buddy seat and extending below toward a floorboard of the tractor, wherein said vertical support is deployed from a side of said bottom portion thereby allowing said bottom portion to cover a portion of said fender;
   (c) a floorboard support leg connected to the vertical support and terminating at an anchor leg, and
   (d) a foundation member which attaches said anchor leg to a vertical portion of said floorboard of the tractor.

2. The apparatus of claim 1 wherein said vertical support member and said floorboard support leg and said anchor leg comprise three legs bent at approximately 90° angles.

3. The apparatus of claim 2 wherein said foundation member comprising a generally horizontal frame member and fasteners extend therethrough, wherein:
   (a) said anchor leg is attached to said horizontal frame member; and
   (b) said horizontal frame member is removably attached to a hump above the floorboard of the tractor by fasteners.

4. The apparatus of claim 3 wherein said vertical support member and said floorboard support leg and said anchor leg are serially formed of a continuous metal member bent into 90° angles.

5. The apparatus of claim 4 further including a reinforcing gusset and a fastener, wherein said fastener connects said reinforcing gusset to an upper end of said vertical support member.

6. The apparatus of claim 5 including a horizontal seat frame under said seat assembly having a front side at right angles to a plane of said bottom plate portion of said seat assembly and under said seat assembly.

7. The apparatus of claim 6 further comprising a resilient pad positioned between said horizontal seat frame and said fender to cushion contact between said horizontal seat frame and said fender, and to further prevent scratching of paint on said fender by said horizontal seat frame.

8. The apparatus of claim 1 wherein said bent back portion is between 5 and 15° from the vertical.

9. The apparatus of claim 8 wherin said vertical support member and said floorboard support leg and said anchor leg comprise three legs bent at approximately 90° angles.

10. The apparatus of claim 9 wherein said foundation member comprises a generally horizontal frame member and fasteners extend therethrough, wherin:
    (a) said anchor leg is attached to said horizontal frame member; and
    (b) said horizontal frame member is removably attached to a hump above the floorboard of the tractor by fasteners.

11. The apparatus of claim 10 wherein said vertical support member and said floorboard support and said anchor legs are serially formed of a continuous metal member bent into 90° angles.

12. The apparatus of claim 11 further including a reinforcing gusset and a fastener, wherein said fastener connects said reinforcing gusset to an upper end of said vertical support member.

13. The apparatus of claim 12 including a horizontal seat frame under said seat assembly having a front side at right angles to a plane of said bottom plate portion of said seat assembly and under said seat assembly.

14. The apparatus of claim 13 further comprising a resilient pad positioned between said horizontal seat frame and said fender to cushion contact between said horizontal seat frame and said fender, and to further prevent scratching of pain on said fender by said horizontal seat frame.

15. The apparatus of claim 1 wherein said back cushion and said bottom cushion are formed of cushion material for comfort.

16. The apparatus of claim 1 further comprising a sacrificial shim stock placed between said floorboard support leg and said floorboard to protect finish of said floorboard from scrapping by said floorboard support leg.

\* \* \* \* \*